(12) United States Patent
Goehler

(10) Patent No.: US 9,099,798 B2
(45) Date of Patent: Aug. 4, 2015

(54) CURRENT-SOURCE CONTACTING DEVICE AND CURRENT SOURCE HAVING METAL-INFILTRATED CERAMIC

(75) Inventor: Jan Goehler, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 292 days.

(21) Appl. No.: 13/702,895

(22) PCT Filed: Apr. 15, 2011

(86) PCT No.: PCT/EP2011/055989
§ 371 (c)(1),
(2), (4) Date: Sep. 10, 2013

(87) PCT Pub. No.: WO2011/154186
PCT Pub. Date: Dec. 15, 2011

(65) Prior Publication Data
US 2013/0344753 A1   Dec. 26, 2013

(30) Foreign Application Priority Data
Jun. 8, 2010   (DE) .......................... 10 2010 029 782

(51) Int. Cl.
| | |
|---|---|
| H01R 9/24 | (2006.01) |
| H01R 13/03 | (2006.01) |
| B22D 19/14 | (2006.01) |
| B22F 3/26 | (2006.01) |
| C22C 32/00 | (2006.01) |
| H01M 2/20 | (2006.01) |
| H01M 2/32 | (2006.01) |
| H01R 43/00 | (2006.01) |

(52) U.S. Cl.
CPC ............... *H01R 13/03* (2013.01); *B22D 19/14* (2013.01); *B22F 3/26* (2013.01); *C22C 32/0021* (2013.01); *C22C 32/0047* (2013.01); *C22C 32/0089* (2013.01); *H01M 2/202* (2013.01); *H01M 2/32* (2013.01); *H01R 43/00* (2013.01)

(58) Field of Classification Search
CPC ........................................................ H01R 13/03
USPC ........................................... 439/887; 429/405
See application file for complete search history.

(56) References Cited

U.S. PATENT DOCUMENTS

| | | | |
|---|---|---|---|
| 5,735,332 A | * | 4/1998 | Ritland et al. .................. 164/98 |
| 6,051,330 A | | 4/2000 | Fasano et al. |

(Continued)

FOREIGN PATENT DOCUMENTS

| | | |
|---|---|---|
| CN | 201490278 | 5/2010 |
| DE | 197 30 003 | 1/1999 |

(Continued)

OTHER PUBLICATIONS

International Search Report, International Application No. PCT/EP2011/055989, dated Aug. 1, 2011.

*Primary Examiner* — Vanessa Girardi
(74) *Attorney, Agent, or Firm* — Kenyon & Kenyon LLP

(57) ABSTRACT

A current-source contacting device, a current source and a current-source contacting system are described. To increase the mechanical stability, corrosion resistance and temperature stability of current-transferring members of the current-source contacting device, the current source and the current-source contacting system, these current-transferring members are made of a metal-infiltrated ceramic. A method for producing metal-infiltrated ceramic bodies, metal-infiltrated ceramic bodies produced in this manner, as well as their use, are also described.

16 Claims, 2 Drawing Sheets

(56) References Cited

U.S. PATENT DOCUMENTS

| | | |
|---|---|---|
| 2005/0118482 A1 | 6/2005 | Sriramulu et al. |
| 2008/0241667 A1 | 10/2008 | Kohn et al. |
| 2009/0050680 A1* | 2/2009 | Martin et al. ............. 228/262.9 |
| 2010/0009163 A1 | 1/2010 | Lindemann et al. |

FOREIGN PATENT DOCUMENTS

| | | |
|---|---|---|
| JP | 62-23064 | 2/1987 |
| JP | 7-142041 | 6/1995 |
| JP | H 09199167 | 7/1997 |
| JP | H 09219186 | 8/1997 |
| JP | 10-144286 | 5/1998 |
| JP | 11-86831 | 3/1999 |
| JP | 2004-119062 | 4/2004 |
| JP | 2007-506256 | 3/2007 |
| JP | 200980963 | 4/2009 |
| JP | 2009115432 | 5/2009 |
| WO | WO 97/19774 | 6/1997 |
| WO | WO 2008/052834 | 5/2008 |

* cited by examiner

CURRENT-SOURCE CONTACTING DEVICE AND CURRENT SOURCE HAVING METAL-INFILTRATED CERAMIC

FIELD OF THE INVENTION

The present invention relates to a current-source contacting device, a current source and a current-source contacting system based on metal-infiltrated ceramic bodies, as well as a method for producing metal-infiltrated ceramic bodies, metal-infiltrated ceramic bodies produced in such a manner and their use.

BACKGROUND INFORMATION

Individual battery cells, accumulator cells or fuel-cell cells are usually interconnected to form packs and modules in order to achieve the capacitances and voltages required by the target application. Depending on the form of the contact points of the cells, the contacting is accomplished either integrally by soldering or welding, or with form locking and/or force locking by wiring, clamping or screw-coupling of the contacts.

One major challenge lies in ensuring a constantly high current-carrying capacity and a constantly low contact resistance between the cell and the contacting device during operation and over the entire operating time. Temperature fluctuations, effects of moisture and external mechanical stresses such as vibrations during the operating time may weaken the contacting and lead to an increase in contact resistance, and therefore to a decrease in battery performance.

Material-locking contactings make it possible to achieve very low contact resistance, however, replacement of individual defective cells is associated with considerable expenditure.

It may be that force-locking and/or form-locking contactings make it easy to replace individual cells due to releasable contactings; however, conventional contact materials such as metallic copper, aluminum, silver or gold may exhibit creep effects under mechanical strain, e.g., due to a clamping connection or screw connection, with the result that the contact resistance at the contact point increases with time. In particular, elevated temperatures which may be present when used in automobiles, for example, may accelerate the creep effects considerably. If, besides elevated temperatures, the effects of moisture also occur, this may lead to corrosion of the contact points and therefore to a further increase in the contact resistance.

SUMMARY

In accordance with the present invention, a current-source contacting device is provided for the electrical contacting of one or more electric current sources, especially for the electrical interconnection of at least two electric current sources, particularly battery units, accumulator units or fuel-cell units. In accordance with the present invention, the current-source contacting device includes at least one contact unit, made of a metal-infiltrated ceramic, for the electrical contacting of at least one contact element of an electric current source.

A "metal-infiltrated ceramic" within the meaning of the present invention may be understood, in particular, as a metal-ceramic composite which is produced by partially or completely infiltrating a porous, e.g., spongy and/or possibly presintered ceramic or ceramic body with, especially, a molten metallic component. In other words, a "metal-infiltrated ceramic" may be understood, in particular, to be a metal-ceramic composite which is produced by partially or completely filling the pores of a porous, e.g., spongy and/or possibly presintered ceramic or ceramic body with, in particular, a molten metallic component, especially using an infiltration process. Or, expressed differently, the contact unit or the contact element explained later may be implemented as a porous ceramic body having infiltrated metal.

A battery unit, accumulator unit or fuel-cell unit within the meaning of the present invention may be understood to be a single battery cell, accumulator cell or fuel-cell cell; a battery-, accumulator- or fuel-cell package/pack made up of a plurality of battery cells, accumulator cells or fuel-cell cells; or a battery-, accumulator- or fuel-cell module made up of a plurality of battery-, accumulator- or fuel-cell packages/packs.

In particular, the example current-source contacting device according to the present invention may be designed for the electrical contacting of one or more battery cells, packages or modules, for example, for use in the automotive sector.

In accordance with the present invention, the metallic component of the metal-infiltrated ceramic provides advantageously for a high electrical and thermal conductivity.

Particularly because of its three-dimensional network structure, the ceramic component of the metal-infiltrated ceramic within the scope of the present invention provides advantageously for a high resistance to corrosion, high temperature stability (e.g., of up to 800° C. for copper-infiltrated ceramics) and high mechanical stability, especially resistance to pressure. Due to the high resistance to pressure, the creep effect may in turn be reduced or even prevented.

Advantageously, larger ceramic members having complex geometries are also able to be infiltrated with metal in a manner that is complete and without cracks. As a result, the current-source contacting device may also include larger metal-infiltrated ceramic contact units, particularly a contact bridge or contact plate, which, in addition to the electrical contacting of at least one contact element of an electric current source, are advantageously designed for the mechanical fixation of at least one electric current source. Because of the mechanical stability, especially the rigidity and strength, of the ceramic component, the amount of material used and therefore the additional costs and the weight may advantageously be minimized.

Within the scope of the present invention, for example, the ceramic component of the metal-infiltrated ceramic may be oxide-based, nitride-based and/or carbide-based. The metallic component of the metal-infiltrated ceramic within the scope of the present invention preferably is electrically highly conductive.

For example, the at least one metal-infiltrated ceramic contact unit may be implemented as a preform metal matrix composite (P-MMC). In this case, the porous, e.g., spongy and/or possibly presintered ceramic body may represent a preform that is infiltrated partially or completely with, in particular, a molten metallic component during the manufacturing process. The metal-infiltrated ceramic of the at least one metal-infiltrated ceramic contact unit may be produced, in particular, by infiltrating a porous ceramic preform with a molten metallic component, e.g., with the aid of diecasting or pressure casting, especially by gas-pressure infiltration or using squeeze-casting technology.

Within the scope of one specific embodiment of the current-source contacting device, the metallic component of the metal-infiltrated ceramic is selected from the group made up of copper, silver, gold, aluminum, iron, tin and their alloys, especially copper and copper alloys. Such metallic components have proven to be particularly advantageous for the contacting of current sources.

Within the scope of a further specific embodiment of the current-source contacting device, the ceramic component of the metal-infiltrated ceramic is selected from the group made up of oxides, nitrides and carbide of aluminum, titanium and silicon as well as mixtures thereof, e.g., aluminum oxide ($Al_2O_3$), aluminum nitride (AlN), titanium nitride (TiN), silicon nitride ($Si_3N_4$), silicon carbide (SiC) and mixtures thereof. Such ceramic components have proven to be especially advantageous for the forming of metal-infiltrated ceramic contact units for the contacting of current sources.

In particular, the metal-infiltrated ceramic may have a specific electrical resistance in a range from approximately $\geq 0.05$ $\mu\Omega m$ to $\leq 1015$ $\Omega m$. The specific electrical resistance may be adjusted advantageously by varying the portion of the metallic component and the portion of the ceramic component in the metal-infiltrated ceramic.

Within the scope of another specific embodiment of the current-source contacting device, the at least one metal-infiltrated ceramic contact unit has a metallic coating, particularly a metallic recast, which partially or completely covers the surface of the metal-infiltrated ceramic contact unit. Because of the metallic coating or metallic recast, the contacting of the metal-infiltrated ceramic contact unit may be accomplished with a rigid or flexible electrical conductor, making it possible to achieve particularly low contact resistances. Advantageously, such a metallic coating may form a material-locking transition to the metallic component of the metal-infiltrated ceramic. In this way, contact resistances may be reduced or even avoided. In addition, creep effects may be offset advantageously by elastic prestressing of the metal-infiltrated ceramic.

Within a refinement of this specific embodiment of the current-source contacting device, the metallic coating, particularly the metallic recast, is formed from the metallic component of the metal-infiltrated ceramic. In this manner, the metallic continuity with the metallic component of the metal-infiltrated ceramic, and therefore the electrical linkup with the metallic component of the metal-infiltrated ceramic, may advantageously be improved.

Within a further development of this specific embodiment of the current-source contacting device, the surface of the metallic coating, especially of the metallic recast, is covered partially or completely by a protective layer, particularly a layer protective against corrosion. In this way, the resistance, particularly the corrosion resistance of the metallic coating or metallic recast may be increased.

In general, the at least one metal-infiltrated ceramic contact unit may be implemented in any suitable form. In particular, it is possible for the current-source contacting device to include a plurality of metal-infiltrated ceramic contact units in the same or different forms. For example, the current-source contacting device may include one or more plate-shaped, metal-infiltrated ceramic contact units. They may have different sizes. For instance, the current-source contacting device may include at least one, especially plate-shaped, metal-infiltrated ceramic contact bridge for the electrical contacting, particularly for the series connection or parallel connection, of two electric current sources. In this context, the contact bridge may electrically contact/interconnect the contact element of the negative pole of the first current source and the contact element of the positive pole of the second current source (series connection), or the contact element of the negative pole of the first current source and the contact element of the negative pole of the second current source (parallel connection). Moreover, in the case of a series connection, for example, the current-source contacting device may include at least two further, especially plate-shaped, metal-infiltrated ceramic contact units, the first contact unit being formed for the electrical contacting of the contact element of the positive pole of the first current source, and the second contact unit being formed for the electrical contacting of the contact element of the negative pole of the second current source. Moreover, in the case of a parallel connection, for example, the current-source contacting device may include at least one further, especially plate-shaped, metal-infiltrated ceramic contact unit, which is formed for the electrical contacting of the contact element of the positive pole of the first current source and the contact element of the positive pole of the second current source.

Within the scope of a further specific embodiment of the current-source contacting device, the at least one metal-infiltrated ceramic contact unit is in the form of a part of a dovetail joint, especially dovetail-groove-shaped. For example, in this case, the contact unit may be in the form of a dovetail-groove, which corresponds to a dovetail-feather-shaped contact element of an electric current source. This has the advantage of a connection that is quickly releasable again, and is advantageous particularly for the electrical contacting and mechanical fixation of a plurality of current sources, e.g., in the form of battery modules, for instance, in the vehicle sector.

Within the scope of another specific embodiment of the current-source contacting device, the current-source contacting device includes at least one joining device for the force-locking and/or form-locking joining of one or more metal-infiltrated ceramic contact units to one or more current-source contact elements. Preferably, the joining device is a releasable joining device for the releasable, force-locking and/or form-locking joining of one or more metal-infiltrated ceramic contact units to one or more current-source contact elements. For example, the joining device may be a clamp-joining device, a screw-joining device or a dovetail-joining device. For instance, the joining device may be designed to apply a force to a metal-infiltrated ceramic contact unit, in the form of a part of a dovetail joint, in such a way that the contact unit is joined with force and form locking to a contact element—in the form of the corresponding dovetail-joint part—of a current source.

The present invention further includes an electric current source, particularly a battery unit, accumulator unit or fuel-cell unit, which includes at least one contact element, formed of a metal-infiltrated ceramic, for transferring the current of the current source.

As explained above in connection with the example current-source contacting device of the present invention, the metallic component of the metal-infiltrated ceramic provides for a high electrical and thermal conductivity, whereas the ceramic component of the metal-infiltrated ceramic provides for a high resistance to corrosion, high temperature stability and high mechanical stability and durability, particularly resistance to pressure, and therefore an advantageous decrease or even avoidance of creep effects.

Such current sources, together with a current-source contacting device according to the present invention, are able to form an especially advantageous current-source contacting system.

In particular, the current source of the present invention may be a battery cell, a battery pack or a battery module.

For example, the at least one metal-infiltrated ceramic contact element may be implemented as a preform metal matrix composite (P-MMC). In this case, the porous, e.g., spongy and/or possibly presintered ceramic body may represent a preform that is infiltrated partially or completely with, in particular, a molten metallic component during the manufacturing process. In particular, the metal-infiltrated ceramic of the at least one metal-infiltrated ceramic contact element may be produced by infiltrating a porous ceramic preform with a molten metallic component, e.g., with the aid of diecasting or pressure casting, especially by gas-pressure infiltration or using squeeze-casting technology.

Within the scope of one specific embodiment of the current source according to the present invention, the metallic component of the metal-infiltrated ceramic is selected from the group made up of copper, silver, gold, aluminum, iron, tin and their alloys, especially copper and copper alloys. Such metallic components have proven to be particularly advantageous for the contacting of the current source.

Within the scope of a further specific embodiment of the current source according to the present invention, the ceramic component of the metal-infiltrated ceramic is selected from the group made up of oxides, nitrides and carbide of aluminum, titanium and silicon as well as mixtures thereof, e.g., aluminum oxide ($Al_2O_3$), aluminum nitride (AlN), titanium nitride (TiN), silicon nitride ($Si_3N_4$), silicon carbide (SiC) and mixtures thereof. Such ceramic components have proven to be especially advantageous for the forming of metal-infiltrated ceramic contact elements for transferring the current of a current source.

In particular, the metal-infiltrated ceramic may have a specific electrical resistance in a range from approximately ≥0.05 $\mu\Omega$m to ≤1015 $\Omega$m. The specific electrical resistance may be adjusted advantageously by varying the portion of the metallic component and the portion of the ceramic component in the metal-infiltrated ceramic.

Within the scope of a further specific embodiment of the current source according to the present invention, the at least one metal-infiltrated ceramic contact element has a metallic coating, particularly a metallic recast, which at least partially covers the surface of the metal-infiltrated ceramic contact element. Because of the metallic coating or metallic recast, the contacting of the metal-infiltrated ceramic contact element may be accomplished with a rigid or flexible electrical conductor, making it possible to achieve particularly low contact resistances. Advantageously, such a metallic coating may form a material-locking transition to the metallic component of the metal-infiltrated ceramic. In this way, contact resistances may be reduced or even avoided. In addition, creep effects may be offset advantageously by elastic prestressing of the metal-infiltrated ceramic.

Within the scope of a further specific embodiment of the current source according to the present invention, the metallic coating, particularly the metallic recast, is formed from the metallic component of the metal-infiltrated ceramic. In this manner, the metallic continuity with the metallic component of the metal-infiltrated ceramic, and therefore the electrical linkup with the metallic component of the metal-infiltrated ceramic may advantageously be improved.

Within the scope of another specific embodiment of the current source according to the present invention, the surface of the metallic coating, especially of the metallic recast, is covered partially or completely by a protective layer, e.g., a layer protective against corrosion. In this way, the resistance, particularly the corrosion resistance of the metallic coating or metallic recast may be increased.

In general, the at least one metal-infiltrated ceramic contact element may be implemented in any suitable form. For instance, the at least one metal-infiltrated ceramic contact element may be bolt-shaped or plate-shaped.

Within the scope of a further specific embodiment of the current source according to the present invention, the at least one metal-infiltrated ceramic contact element is in the form of a part of a dovetail joint, especially is dovetail-feather-shaped. For example, in this case, the contact element may take the form of a dovetail feather which corresponds to a dovetail-groove-shaped contact unit of a current-source contacting device. This has the advantage of a connection that is quickly releasable again, and is advantageous particularly for the electrical contacting and mechanical fixation of a plurality of current sources, e.g., in the form of battery modules, for instance, in the vehicle sector.

With regard to further advantages and features of the current source according to the present invention, reference is hereby made explicitly to the explanations in connection with the example current-source contacting device of the present invention.

A further subject matter of the present invention is a current-source contacting system which includes at least one current-source contacting device and at least one current source, the current-source contacting system including at least one current-source contacting device according to the present invention and/or at least one current source according to the present invention.

With regard to the advantages and further features of the current-source contacting system according to the present invention, reference is hereby made explicitly to the explanations in connection with the example current-source contacting device and current source of the present invention.

Moreover, the present invention relates to a method for producing a metal-infiltrated ceramic body, particularly a metal-infiltrated ceramic contact unit for a current-source contacting device according to the present invention and/or a metal-infiltrated ceramic contact element for an electric current source according to the invention, including the method steps of:

a) producing a porous ceramic preform from a ceramic component, b) infiltrating the porous ceramic preform with a molten metallic component.

In this context, the ceramic component may be selected particularly from the group made up of copper, silver, gold, aluminum, iron, tin and their alloys, especially copper and copper alloys. In particular, the metallic component may be selected from the group made up of oxides, nitrides and carbide of aluminum, titanium and silicon, as well as mixtures thereof, e.g., aluminum oxide $Al_2O_3$), aluminum nitride (AlN), titanium nitride (TiN), silicon nitride ($Si_3N_4$), silicon carbide (SiC) and mixtures thereof. The infiltration may be accomplished, for example, by diecasting or pressure casting, especially by gas-pressure infiltration or using squeeze-casting technology.

Within the scope of one specific embodiment of an example method according to the present invention, the method further includes the step of:

c) coating the metal-infiltrated ceramic body with a metallic coating, particularly a metallic recast, which partially or completely covers the surface of the metal-infiltrated ceramic body.

Within a refinement of this specific embodiment of the method according to the present invention, the metallic coating, particularly the metallic recast, is formed from the metallic component of the metal-infiltrated ceramic.

Within the scope of a further specific embodiment of the method according to the present invention, the method further includes the step of:

d) coating the surface of the metallic coating, particularly the metallic recast, with a protective layer, e.g., a layer protective against corrosion, which partially or completely covers the surface of the metallic coating.

With regard to the advantages and further features of the manufacturing method according to the present invention, reference is hereby made explicitly to the explanations in connection with the current-source contacting device and current source of the invention, as well as in connection with the current-source contacting system of the present invention.

A further subject matter of the present invention is a metal-infiltrated ceramic body, e.g., a current-transferring member, produced by a method according to the invention.

With regard to the advantages and further features of the metal-infiltrated ceramic body according to the present invention, reference is hereby made explicitly to the explanations in connection with the current-source contacting device and current source of the invention, as well as in connection with the current-source contacting system and manufacturing method of the present invention.

The present invention further relates to the use of a metal-infiltrated ceramic body, especially a metal-infiltrated ceramic body produced according to the invention, particularly whose ceramic component is selected from the group made up of copper, silver, gold, aluminum, iron, tin and their alloys, especially copper and copper alloys, and whose metallic component is selected from the group made up of oxides, nitrides and carbide of aluminum, titanium and silicon as well as mixtures thereof, e.g., aluminum oxide ($Al_2O_3$), aluminum nitride (AlN), titanium nitride (TiN), silicon nitride ($Si_3N_4$), silicon carbide (SiC) and mixtures thereof, as current-transferring member and/or for the contacting of electrical members.

With regard to the advantages and further features of the use according to the present invention, reference is hereby made explicitly to the description below in connection with the current-source contacting device and current source of the present invention, as well as in connection with the current-source contacting system, manufacturing method and metal-infiltrated ceramic body of the present invention.

BRIEF DESCRIPTION OF THE DRAWINGS

Further advantages and beneficial refinements of the subject matters of the present invention are shown in the figures and explained in the description below. In this context, it should be noted that the figures have only a descriptive, representative character and are not intended to limit the present invention in any form.

DETAILED DESCRIPTION OF THE EXAMPLE EMBODIMENTS

Figure 1:
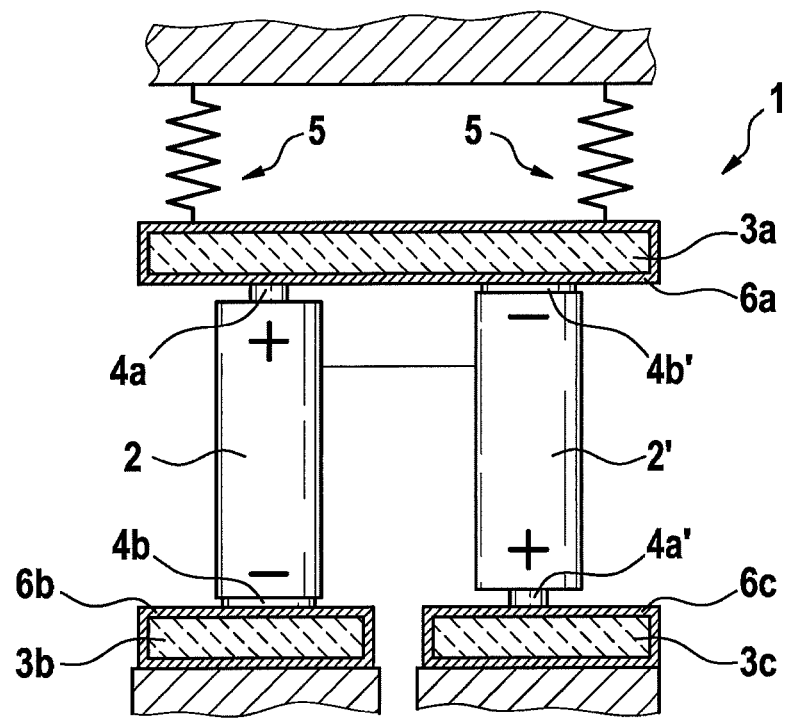
FIG. 1 shows a schematic cross section through a first specific embodiment of a current-source contacting system according to the present invention, which includes a first embodiment of a current-source contacting device according to the invention and a first embodiment of a current source according to the present invention.

FIG. 1 shows two current sources 2, 2', particularly battery cells, according to a first specific embodiment of a current source according to the present invention, each including two plate-shaped contact elements 4a, 4b, 4a', 4b' formed of a metal-infiltrated ceramic. Moreover, FIG. 1 shows a first specific embodiment of a current-source contacting device 1 according to the present invention, which includes three plate-shaped contact units 3a, 3b, 3c, made of a metal-infiltrated ceramic, for the electrical contacting of the four contact elements 4a, 4b, 4a', 4b' of the two electric current sources 2, 2'. FIG. 1 illustrates that current sources 2, 2' and current-source contacting device 1 form a first specific embodiment of a current-source contacting system 1, 2, 2' according to the present invention.

FIG. 1 shows that contact unit 3a is formed as a metal-infiltrated ceramic contact bridge and electrically contacts contact element 4a of the positive pole of first current source 2 and contact element 4b' of the negative pole of second current source 2', and in this way, connects the two current sources 2, 2' in series. The two further contact units 3b and 3c contact element 4b of the negative pole of first current source 2 and contact element 4a' of the positive pole of second current source 2'. Furthermore, FIG. 1 shows that contact units 3a, 3b, 3c each have a metallic coating 6a, 6b, 6c completely covering the surface. FIG. 1 further shows that current-source contacting device 1 includes a clamp-connection device 5 for the force-locking joining of metal-infiltrated ceramic contact units 3a, 3b, 3c to contact elements 4a, 4b, 4a', 4b' of current sources 2, 2'.

Figure 2:
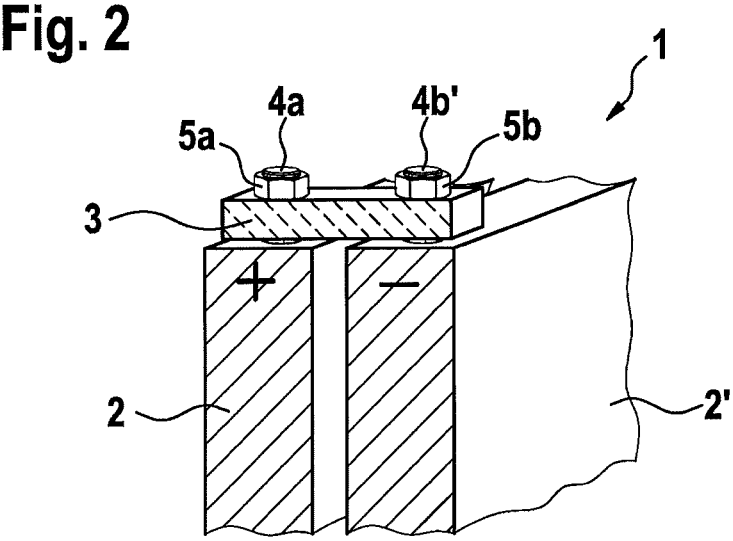
FIG. 2 shows a schematic cross section through a second specific embodiment of a current-source contacting system according to the present invention, which includes a second embodiment of a current-source contacting device according to the invention and a second embodiment of a current source according to the present invention.

FIG. 2 shows two current sources 2, 2', particularly prismatic battery cells, according to a second specific embodiment of a current source according to the present invention, each including a bolt-shaped contact element 4a, 4b' formed of a metal-infiltrated ceramic. Moreover, FIG. 1 shows a second specific embodiment of a current-source contacting device 1 according to the present invention, which includes a contact unit 3 formed of a metal-infiltrated ceramic. In this case, contact unit 3 is in the form of a generally plate-shaped contact bridge which has cut-outs for receiving bolt-shaped contact elements 4a, 4b' of current sources 2, 2'. Furthermore, FIG. 2 shows that current-source contacting device 1 includes two screw-connection devices 5a, 5b, particularly threaded nuts, for the force-locking and form-locking joining of metal-infiltrated ceramic contact unit 3 to contact elements 4a, 4b' of current sources 2, 2'. FIG. 2 further illustrates that current sources 2, 2' and current-source contacting device 1 form a second specific embodiment of a current-source contacting system 1, 2, 2' according to the present invention.

Figure 3:
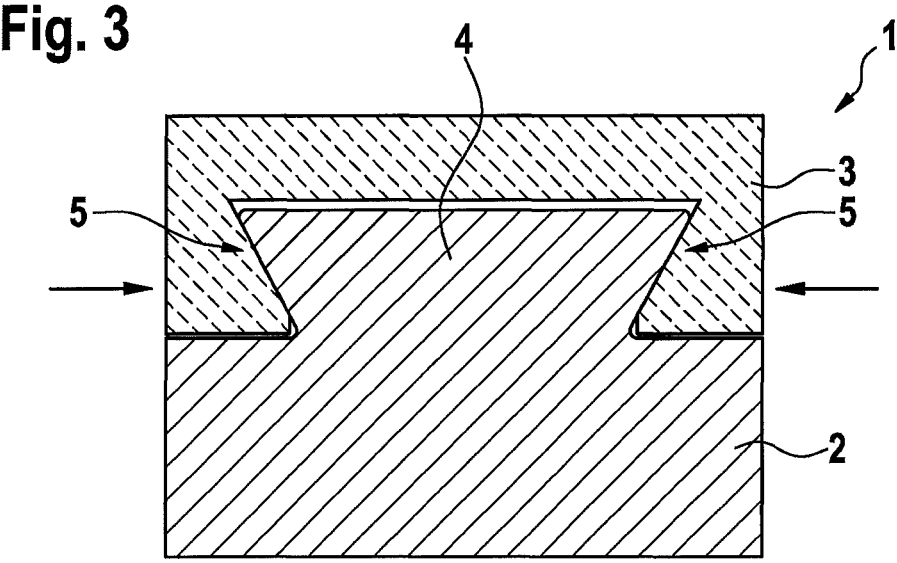
FIG. 3 shows a schematic cross section through a third specific embodiment of a current-source contacting system according to the present invention, which includes a third embodiment of a current-source contacting device according to the invention and a third embodiment of a current source according to the present invention.

FIG. 3 shows a current source 2, particularly battery cells, according to a third specific embodiment of a current source according to the invention, which includes a dovetail-feather-shaped contact element 4 formed of a metal-infiltrated ceramic. Moreover, FIG. 3 shows a third specific embodiment of a current-source contacting device 1 according to the present invention, which includes a corresponding dovetail-groove-shaped contact unit 3 formed of a metal-infiltrated ceramic. FIG. 3 further illustrates that current source 2 and current-source contacting device 1 form a third specific embodiment of a current-source contacting system 1, 2 according to the present invention.

Within this specific embodiment, the contacting is accomplished by inserting dovetail-feather-shaped contact element 4 into dovetail-groove-shaped contact unit 3 and subsequently fixing contact element 4 in place in contact unit 3 with the aid of a force applied from outside (shown by arrows). To apply this force, current-source contacting device 1 includes a dovetail-joining device 5 which is designed to apply a force to dovetail-groove-shaped contact unit 3 and dovetail-feather-shaped contact element 4, positioned in it, in such a way that contact unit 3 is joined to contact element 4 with force and form locking. Owing to this dovetailing principle, advantageously, a complete battery module is able to be coupled both electrically and mechanically to a load.

What is claimed is:

1. A current-source contacting device for electrical interconnection of at least two electric current sources, comprising:
    at least one contact unit for electrically contacting at least one contact element of an electric current source, wherein:
        the at least one contact unit includes (a) a metal-infiltrated ceramic portion that includes a ceramic infiltrated by a metal, and (b) a metallic coating that at least partially coats a surface of the metal-infiltrated ceramic portion and the composition of which includes the same metal as the metal of the metal-infiltrated ceramic portion;
        the metal of the coating links up, and has a metallic continuity, with the metal of the metal-infiltrated ceramic portion.

2. The current-source contacting device as recited in claim 1, wherein the electric current sources include at least one of: i) battery units, ii) accumulator units, and iii) fuel-cell units.

3. The current-source contacting device as recited in claim 1, wherein at least one of: i) the metal is selected from the group of copper, silver, gold, aluminum, iron, tin and their alloys, copper and copper alloys, and ii) the ceramic is selected from the group of oxides, nitrides and carbide of aluminum, titanium and silicon, aluminum oxide, aluminum nitride, titanium nitride, silicon nitride, silicon carbide, and mixtures thereof.

4. The current-source contacting device as recited in claim 1, wherein the at least one metal-infiltrated ceramic contact unit is dovetail-groove-shaped.

5. The current-source contacting device as recited in claim 1, wherein the current-source contacting device includes at least one joining device for at least one of force-locking and form-locking joining of one or more metal-infiltrated ceramic contact units to one or more current-source contact elements.

6. The current-source contacting device as recited in claim 1, wherein a surface of the metallic coating is covered at least partially with a layer protective against corrosion.

7. The current-source contacting device as recited in claim 1, further comprising a clamping device that includes a spring that biases the at least one contact unit against the at least one contact element.

8. The current-source contacting device as recited in claim 1, wherein:
    the metal-infiltrated ceramic portion is formed of a porous ceramic preform, which forms the ceramic and is infiltrated with a molten metallic compound, which forms the metal;
    the metal includes at least one of copper, silver, gold aluminum, iron, tin and their alloys, copper and copper alloys; and
    the ceramic includes at least one of oxides, nitrides and carbide of aluminum, titanium and silicon, aluminum oxide, aluminum nitride, titanium nitride, silicon nitride, silicon carbide, and mixtures thereof.

9. The current-source contacting device as recited in claim 1, wherein the contact unit interconnects and spans between a first electric contact source and a second electric contact source, the interconnection being via a negative pole contact element of the first electric contact source and a positive pole contact element of the second contact source that both contact a same side of the contact unit.

10. The current-source contacting device as recited in claim 9, further comprising a clamping device that includes a spring that biases the contact unit against the negative pole contact element of the first electric contact source and the positive pole contact element of the second electric contact source.

11. An electric current source, comprising:
    at least one contact element to transfer current of the current source, wherein:
        the at least one contact element includes (a) a metal-infiltrated ceramic portion that includes a ceramic infiltrated by a metal, and (b) a metallic coating that at least partially coats a surface of the metal-infiltrated ceramic portion and the composition of which includes the same metal as the metal of the metal-infiltrated ceramic portion; and
        the metal of the coating links up, and has a metallic continuity, with the metal of the metal-infiltrated ceramic portion.

12. The current source as recited claim 11, wherein the at least one metal-infiltrated ceramic contact element is dovetail-feather-shaped.

13. The current source as recited in claim 11, wherein a surface of the metallic coating is covered at least partially with a layer protective against corrosion.

14. The current source as recited in claim 11, wherein the current source is one of a battery unit, an accumulator unit, or a fuel cell unit.

15. The current source as recited in claim 14, wherein at least one of: i) the metal is selected from a group consisting of copper, silver, gold, aluminum, iron, tin and their alloys, copper and copper alloys, and ii) the ceramic is selected from the group consisting of oxides, nitrides and carbide of aluminum, titanium and silicon, aluminum oxide, aluminum nitride, titanium nitride, silicon nitride, silicon carbide, and mixtures thereof.

16. A current-source contacting system, comprising:
    an electric current source; and
    a current-source contacting device including at least one contact unit that includes a metal-infiltrated ceramic portion by which to electrically contact the electric current source;
    wherein:
        the electric current source includes at least one contact element that includes a metal-infiltrated ceramic portion by which to transfer current of the electric current source;
        the metal-infiltrated ceramic portion of the at least one contact unit includes a first ceramic infiltrated by a first metal;
        the metal-infiltrated ceramic portion of the at least one contact element includes the first ceramic or a second ceramic infiltrated by the first metal or a second metal; and
        at least one of:
            the at least one contact unit further includes a metallic coating that at least partially coats a surface of the metal-infiltrated ceramic portion of the at least one contact unit and the composition of which includes the same metal as the metal of the metal-infiltrated ceramic portion of the at least one contact unit; and the at least one contact element further includes a metallic coating that at least partially coats a surface of the metal-infiltrated ceramic portion of the at least one contact element and the composition of which includes the same metal as the metal of the metal-infiltrated ceramic portion of the at least one contact element.

* * * * *